US012614940B2

(12) United States Patent　　　　(10) Patent No.:　US 12,614,940 B2
Pal et al.　　　　　　　　　　　　　 (45) Date of Patent:　Apr. 28, 2026

(54) COOLING OF HIGH-POWER PERMANENT MAGNET MACHINE ROTOR

(71) Applicant: Hamilton Sundstrand Corporation, Charlotte, NC (US)

(72) Inventors: Debabrata Pal, Hoffman Estates, IL (US); Ashutosh Joshi, Roscoe, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 321 days.

(21) Appl. No.: 18/323,599

(22) Filed: May 25, 2023

(65) Prior Publication Data

US 2024/0396392 A1　　Nov. 28, 2024

(51) Int. Cl.
　　*H02K 1/32*　　　(2006.01)
　　*H02K 1/278*　　(2022.01)
　　*H02K 1/28*　　　(2006.01)
　　*H02K 9/19*　　　(2006.01)
(52) U.S. Cl.
　　CPC .............. *H02K 1/32* (2013.01); *H02K 1/278* (2013.01); *H02K 1/28* (2013.01); *H02K 9/19* (2013.01)
(58) Field of Classification Search
　　CPC .. H02K 1/32; H02K 9/19; H02K 1/28; H02K 1/278
　　See application file for complete search history.

(56) References Cited

U.S. PATENT DOCUMENTS

| | | | | |
|---|---|---|---|---|
| 6,215,212 B1* | 4/2001 | Grennan | ................... | H02K 1/32 |
| | | | | 310/58 |
| 6,727,609 B2* | 4/2004 | Johnsen | .................... | H02K 1/32 |
| | | | | 310/58 |
| 7,514,827 B2 | 4/2009 | Hall | | |
| 10,951,093 B2 | 3/2021 | Yasuda | | |
| 11,323,009 B2 | 5/2022 | Okamoto et al. | | |
| 2012/0025642 A1* | 2/2012 | Onimaru | ................... | H02K 1/32 |
| | | | | 310/64 |
| 2020/0259398 A1* | 8/2020 | Konopa | .................... | H02K 9/19 |

(Continued)

FOREIGN PATENT DOCUMENTS

JP　　　　　2020205725 A　* 12/2020　........... H02K 1/2766

OTHER PUBLICATIONS

JP-2020205725-A Machine Translation (Year: 2020).*
Extended European Search Report for EP Application No. 24176451.3, dated Nov. 5, 2024, pp. 1-11.

*Primary Examiner* — Oluseye Iwarere
*Assistant Examiner* — Masoud Vaziri
(74) *Attorney, Agent, or Firm* — CANTOR COLBURN LLP

(57)　　　　　　　　　ABSTRACT

A rotor of an electric machine includes a rotor core, a plurality of permanent magnets located at the rotor core, and a rotor sleeve enclosing the rotor core and the plurality of permanent magnets. One or more sleeve cooling channels are positioned between a radially outer surface of the rotor core and a radially inner surface of the rotor sleeve and extend axially along a length of the rotor. One or more radial cooling channels extend radially outwardly from an interior of the rotor core to the one or more sleeve cooling channels. The one or more radial cooling channels are configured to convey a flow of cooling fluid from the interior of the rotor core to the one or more sleeve cooling channels.

18 Claims, 4 Drawing Sheets

(56)     References Cited

U.S. PATENT DOCUMENTS

| | | | |
|---|---|---|---|
| 2020/0280227 A1* | 9/2020 | Ochiai | .................. H02K 1/278 |
| 2020/0381968 A1 | 12/2020 | Wakui et al. | |
| 2023/0006514 A1* | 1/2023 | Terauchi | ............... H02K 9/193 |

* cited by examiner

COOLING OF HIGH-POWER PERMANENT MAGNET MACHINE ROTOR

BACKGROUND

Exemplary embodiments pertain to the art of electric machines, and more particularly to rotor cooling of permanent magnet electric machine rotors.

High-speed and high-power permanent magnet machines utilize a rotor sleeve to, in part, retain the permanent magnets to the rotor core. In some configurations, this rotor sleeve is formed from steel. Due to high rotational speed of the machine, there is significantly high windage loss generated between rotor and stator air gap. Further, the high current due to operation of the electric machine results in losses in the rotor sleeve as well as in the permanent magnets. In the existing cooling schemes, the majority of the axial length of the rotor sleeve is not accessible to spray cooling flow from the rotor or to mist cooling flow in the air gap between the rotor and the stator. Permanent magnets are rated to a relatively lower temperature, so it is desired to have efficient cooling to maintain the permanent magnets below their rated temperature for efficient operation.

BRIEF DESCRIPTION

In one exemplary embodiment, an electric machine includes a stator having a stator winding, and a rotor configured to rotate about a machine central axis and electromagnetically interactive with the stator across an air gap between the rotor and the stator. The rotor includes a rotor core and a plurality of permanent magnets positioned at the rotor core. A rotor sleeve encloses the rotor core and the plurality of permanent magnets. One or more sleeve cooling channels are located between a radially outer surface of the rotor core and a radially inner surface of the rotor sleeve and extend axially along a length of the rotor. One or more radial cooling channels extend radially outwardly from an interior of the rotor core to the one or more sleeve cooling channels. The one or more radial cooling channels are configured to convey a flow of cooling fluid from the interior of the rotor core to the one or more sleeve cooling channels.

Additionally or alternatively, in this or other embodiments the one or more radial cooling channels are positioned in an axial interior of the rotor core between a first axial end and a second axial end of the rotor core.

Additionally or alternatively, in this or other embodiments the one or more radial cooling channels are located at an axial midpoint of the rotor core.

Additionally or alternatively, in this or other embodiments the flow of cooling fluid is directed into the one or more radial cooling channels from a hollow interior of a rotor shaft.

Additionally or alternatively, in this or other embodiments a mid-stack plate is located in the rotor core. The one or more radial cooling channels are formed in the mid-stack plate.

Additionally or alternatively, in this or other embodiments the one or more radial cooling channels is a plurality of radial cooling channels circumferentially spaced apart in the rotor core.

Additionally or alternatively, in this or other embodiments the one or more radial cooling channels is a plurality of radial cooling channels at two different axial locations of the rotor.

Additionally or alternatively, in this or other embodiments one or more sleeve cooling channel outlets are located at one or more axial ends of the one or more sleeve cooling channels. The one or more sleeve cooling channel outlets are configured to direct the flow of cooling fluid toward an end turn of the stator winding.

In another exemplary embodiment, a rotor of an electric machine includes a rotor core, a plurality of permanent magnets located at the rotor core, and a rotor sleeve enclosing the rotor core and the plurality of permanent magnets. One or more sleeve cooling channels are positioned between a radially outer surface of the rotor core and a radially inner surface of the rotor sleeve and extend axially along a length of the rotor. One or more radial cooling channels extend radially outwardly from an interior of the rotor core to the one or more sleeve cooling channels. The one or more radial cooling channels are configured to convey a flow of cooling fluid from the interior of the rotor core to the one or more sleeve cooling channels.

Additionally or alternatively, in this or other embodiments the one or more radial cooling channels are positioned in an axial interior of the rotor core between a first axial end and a second axial end of the rotor core.

Additionally or alternatively, in this or other embodiments the one or more radial cooling channels are located at an axial midpoint of the rotor core.

Additionally or alternatively, in this or other embodiments the flow of cooling fluid is directed into the one or more radial cooling channels from a hollow interior of a rotor shaft.

Additionally or alternatively, in this or other embodiments a mid-stack plate is positioned in the rotor core. The one or more radial cooling channels are formed in the mid-stack plate.

Additionally or alternatively, in this or other embodiments the one or more radial cooling channels is a plurality of radial cooling channels circumferentially spaced apart in the rotor core.

Additionally or alternatively, in this or other embodiments the one or more radial cooling channels is a plurality of radial cooling channels at two different axial locations of the rotor.

Additionally or alternatively, in this or other embodiments one or more sleeve cooling channel outlets are located at one or more axial ends of the one or more sleeve cooling channels. The one or more sleeve cooling channel outlets are configured to direct the flow of cooling fluid toward an end turn of a stator winding of the electric machine.

In yet another exemplary embodiment, a method of cooling a rotor of a permanent magnet electric machine includes directing a flow of cooling fluid into an interior of a rotor core of the rotor, urging the flow of cooling fluid radially outwardly through one or more radial cooling channels defined in the rotor core, and directing the flow of cooling fluid from the one or more radial cooling channels along one or more sleeve cooling channels extending in an axial direction between the rotor core and a rotor sleeve surrounding the rotor core.

Additionally or alternatively, in this or other embodiments the one or more radial cooling channels are positioned in an axial interior of the rotor core between a first axial end and a second axial end of the rotor core.

Additionally or alternatively, in this or other embodiments the one or more radial cooling channels are formed in a mid-stack plate located in the rotor core.

Additionally or alternatively, in this or other embodiments the one or more radial cooling channels is a plurality of radial cooling channels circumferentially spaced apart in the rotor core.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
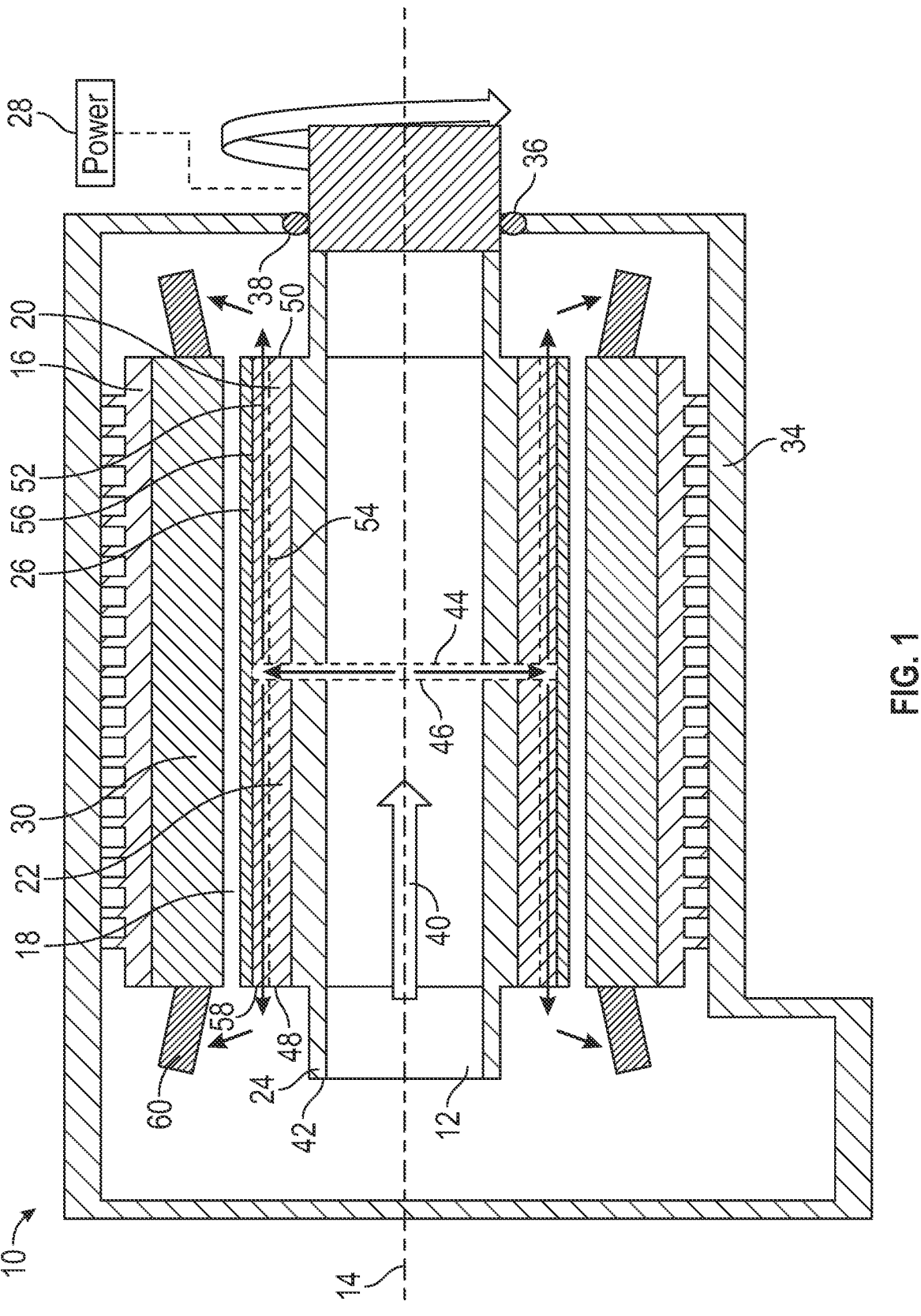
FIG. 1 is a cross-sectional view of an embodiment of an electric machine.

Illustrated in FIG. 1 is an embodiment of an electric machine 10. The electric machine 10 includes a rotor 12 which is rotatable about a machine central axis 14. The electric machine 10 further includes a stator 16 surrounding the rotor 12 and positioned radially outboard of the rotor 12. The rotor 12 and the stator 16 define an air gap 18. While in the illustrated embodiment the stator 16 is located radially outboard of the rotor 12, one skilled in the art will readily appreciate that the present disclosure may be readily applied to other machine configurations, such as configurations where the rotor 12 is located radially outboard of the stator 16.

The rotor 12 includes a rotor core 20 and a plurality of permanent magnets 22 arrayed in the rotor core 20. In some embodiments the rotor core 20 includes a substantially tubular rotor shaft 24 located at the machine central axis 14. Further, a rotor sleeve 26 is located radially outboard of the plurality of permanent magnets 22 and circumferentially surrounding the rotor core 20 to retain the plurality of permanent magnets 22 to the rotor core 20. The rotor sleeve 26 at least partially defines the air gap 18 between the rotor 12 and the stator 16.

In some embodiments, as illustrated in FIG. 1, the electric machine 10 is operated as a generator in which the rotor 12 is driven about the machine central axis 14 by a power source, schematically shown at 28. Rotation of the rotor 12 relative to the stator 16 generates electromagnetic interaction between the permanent magnets 22 and stator windings 30 of the stator 16, resulting in electrical power being generated at the stator windings 30.

Figure 2:
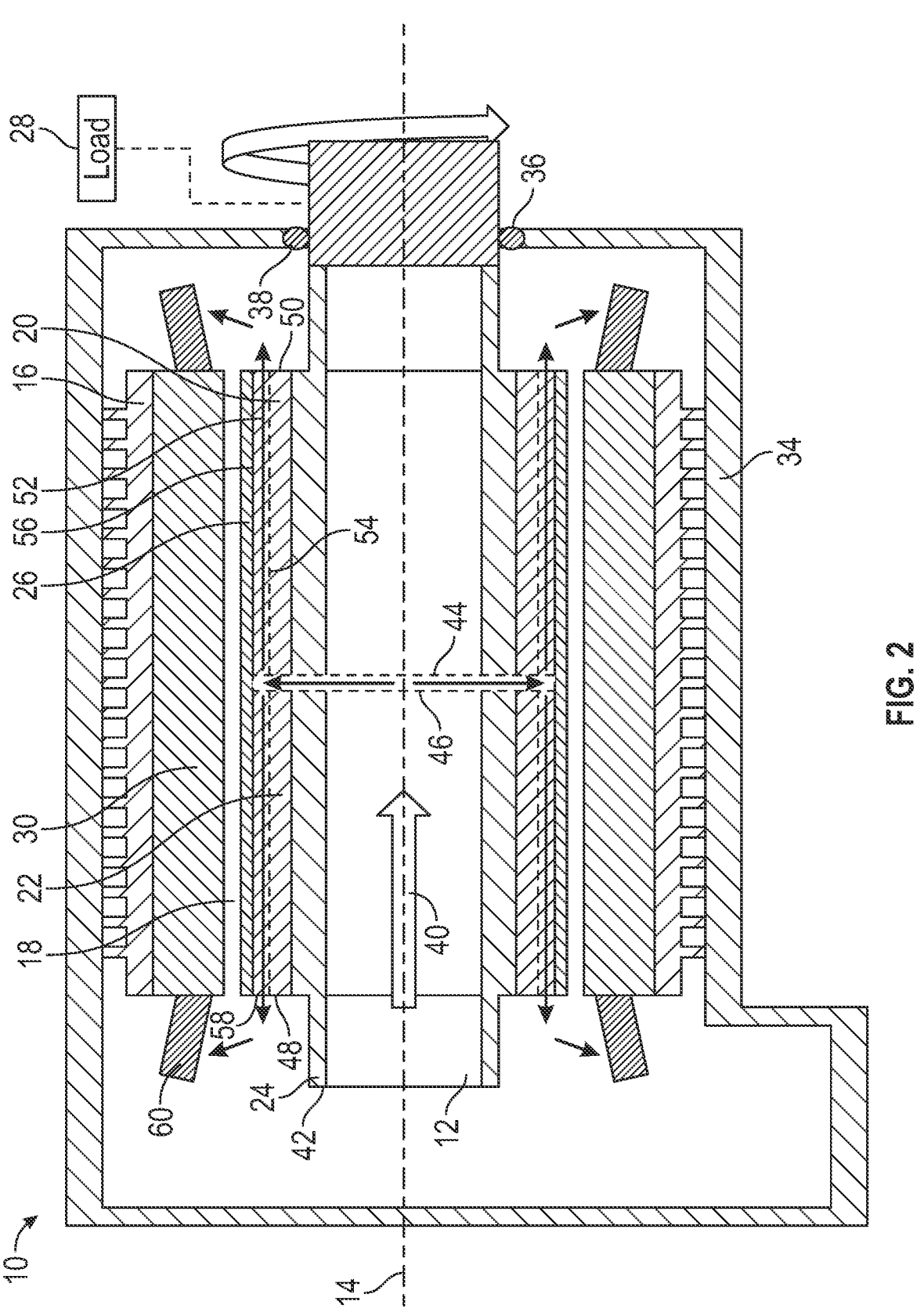
FIG. 2 is a cross-sectional view of an embodiment of an electric machine operated as a motor.

Alternatively, the electric machine 10 may be operated as a motor as illustrated in FIG. 2. In such configurations, an electrical current may be applied to the stator windings 30 which urges rotation of the rotor 12 about the machine central axis 14 due to electromagnetic interaction between the stator windings 30 and the permanent magnets 22. The rotor shaft 24 may be connected to a mechanical load 32, and provides mechanical energy thereto.

Figure 3:
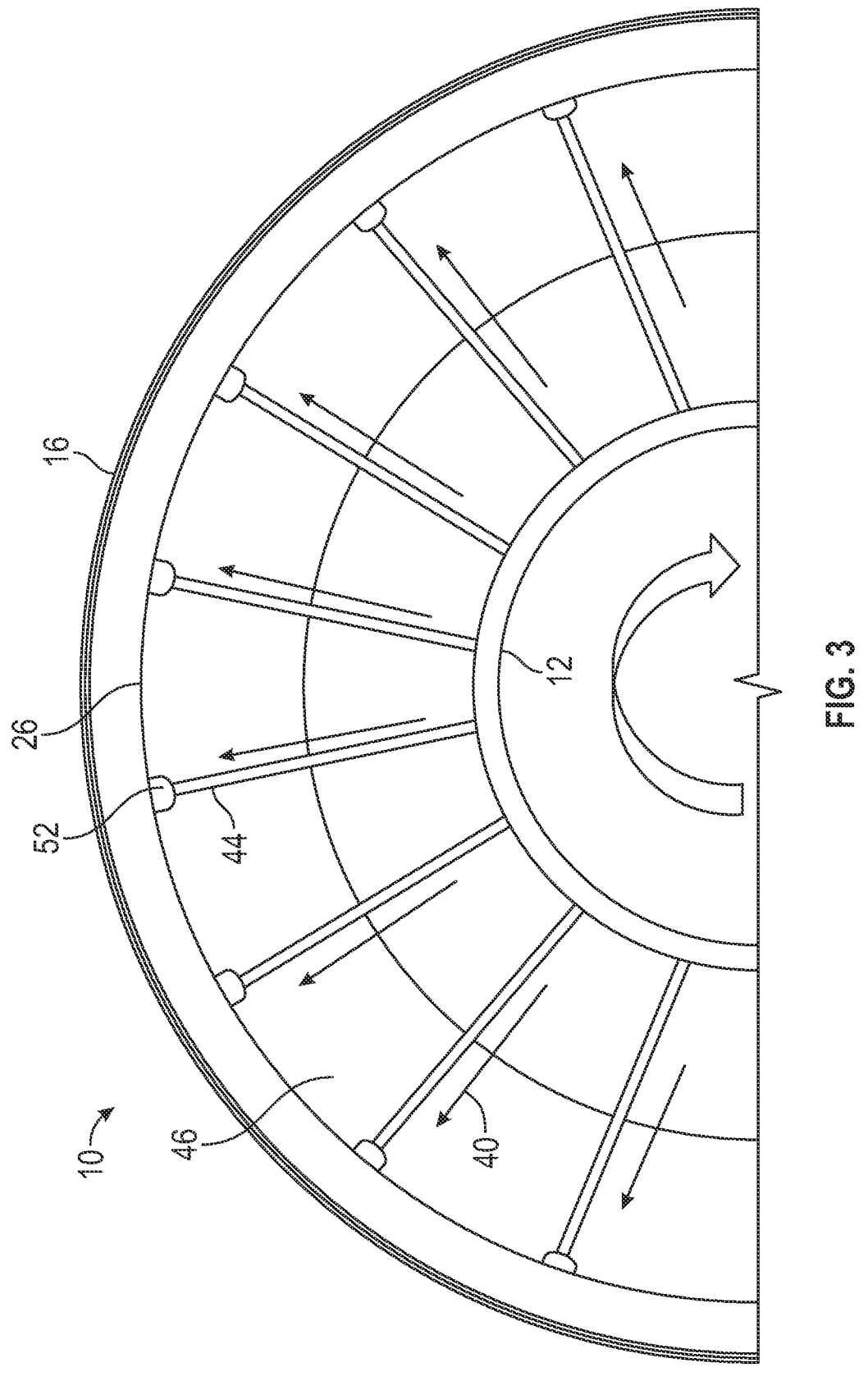
FIG. 3 is another cross-sectional view of an embodiment of an electric machine.

The rotor 12 and the stator 16 are at least partially contained in a machine housing 34, with the rotor shaft 24 extending through a housing opening 36 in the machine housing 34. One or more sealing elements 38 may be located between the rotor shaft 24 and the machine housing 34 to prevent leakage through the housing opening 36. The rotor 12 is cooled via a flow of cooling fluid 40 entering via a rotor cooling inlet 42 in the tubular rotor shaft 24. As shown in FIG. 3, and with continued reference to FIG. 1, the flow of cooling fluid 40 is directed into a shaft interior of the rotor shaft 24, and radially outwardly along a plurality of radial cooling channels 44, which in some embodiments are located in a mid-stack plate 46 of the rotor 12. In some embodiments, the rotor core 20 is formed from a plurality of laminations stacked along the machine central axis 14, and the mid-stack plate 46 is located between two axially-adjacent lamination of the plurality of laminations.

The radial cooling channels 44 are located in the rotor 12 at a location between a first axial end 48 and a second axial end 50 of the rotor 12, remotely from the first axial end 48 and the second axial end 50, in an interior of the rotor 12. In one embodiment, such as shown in FIG. 1, the radial cooling channels 44 are located at an axial midpoint of the rotor 12. As shown best in FIG. 3, the radial cooling channels 44 are spaced circumferentially around the rotor 12, and in some embodiments are equally circumferentially spaced. One skilled in the art will readily appreciate that the spacing, size and other characteristics of the radial cooling channels 44 may be varied to provide desired cooling properties.

Referring again to FIG. 1, the flow of cooling fluid 40 is urged through the radial cooling channels 44 via rotation of the rotor 12 about the machine central axis 14. From the radial cooling channels 44 the flow of cooling fluid 40, such as oil, proceeds in an axial direction along a plurality of sleeve cooling channels 52, which in some embodiments are defined between a radially outer surface 54 of the rotor 12 and a radially inner surface 56 of the rotor sleeve 26. The flow of cooling fluid 40 along the radial cooling channels 44 and the sleeve cooling channels 52 provides cooling of the permanent magnets 22 and the rotor sleeve 26, thus improving the performance of the electric machine 10.

The flow of cooling fluid 40 proceeds along the plurality of sleeve cooling channels 52 both toward the first axial end 48 and the second axial end 50 and through a sleeve channel outlet 58 into the machine housing 34. In some embodiments, the flow of cooling fluid 40 exiting the sleeve channel outlet 58 impinges or sprays onto end turns 60 of the stator windings 30 thus providing cooling to the end turns 60.

Figure 4:
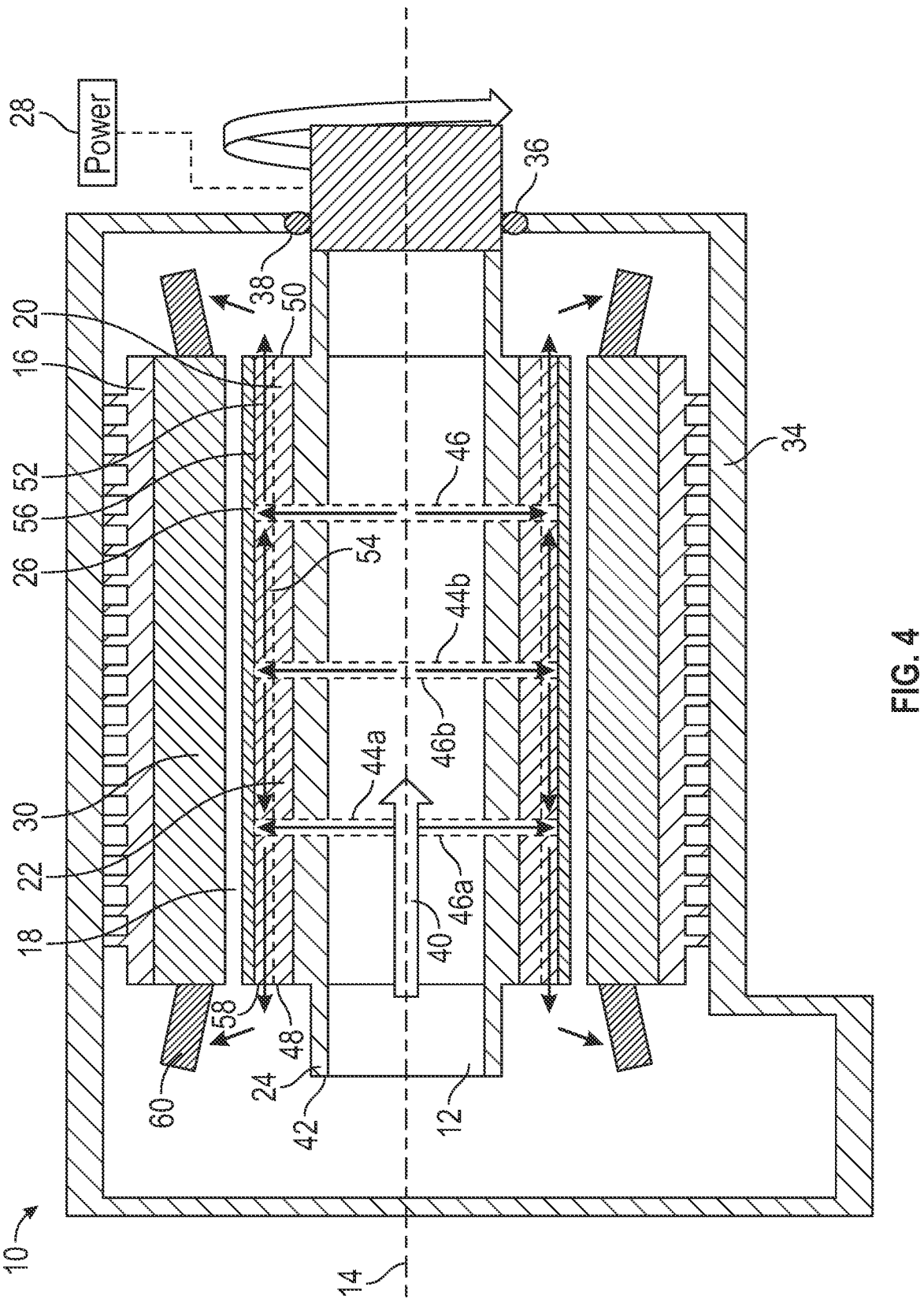
FIG. 4 is yet another cross-sectional view of an embodiment of an electric machine.

While in the embodiment of FIG. 1, one mid-stack plate 46 is utilized and includes the radial cooling channels 44, in other embodiments such as shown in FIG. 4, the rotor includes multiple mid-stack plates 46 each having a plurality of radial cooling channels. In some embodiments, the first radial cooling channels 44a of a first mid-stack plate 46a are circumferentially offset from second radial cooling channels 44b of a second mid-stack plate 46b to provide even distribution of the flow of cooling fluid 40 throughout the rotor 12.

The cooling arrangements disclosed herein including the radial cooling channels 44 located along the rotor 12 between the first axial end 48 and the second axial end 50 and the sleeve cooling channels 52, provides needed cooling to the permanent magnets 22 and the rotor sleeve 26 thus improving performance of the rotor 12 and the electric machine 10. This improves the power to weight ratio of the electric machine 10 when compared to other cooling schemes and improves reliability of the electric machine due to the reduced operating temperatures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric machine, comprising:
a stator including a stator winding; and
a rotor configured to rotate about a machine central axis and electromagnetically interactive with the stator across an air gap between the rotor and the stator, the rotor including:
a rotor core;
a plurality of permanent magnets disposed at the rotor core;
a rotor sleeve enclosing the rotor core and the plurality of permanent magnets;
one or more sleeve cooling channels disposed between a radially outer surface of the rotor core and a radially inner surface of the rotor sleeve and extending axially along a length of the rotor;
a first mid-stack plate disposed in the rotor core including one or more first radial cooling channels formed in the first mid-stack plate; and
a second mid-stack plate disposed in the rotor core including one or more second radial cooling channels formed in the second mid-stack plate;
wherein the one or more first radial cooling channels and the one or more second radial cooling channels extend radially outwardly from an interior of the rotor core to the one or more sleeve cooling channels, the one or more first radial cooling channels and the one or more second radial cooling channels configured to convey a flow of cooling fluid from the interior of the rotor core to the one or more sleeve cooling channels.

2. The electric machine of claim 1, wherein the one or more first radial cooling channels and the one or more second radial cooling channels are positioned in an axial interior of the rotor core between a first axial end and a second axial end of the rotor core.

3. The electric machine of claim 2, wherein one of the one or more first radial cooling channels or the one or more second radial cooling channels are located at an axial midpoint of the rotor core.

4. The electric machine of claim 1, wherein the flow of cooling fluid is directed into the one or more first radial cooling channels and the one or more second radial cooling channels from a hollow interior of a rotor shaft.

5. The electric machine of claim 1, wherein the one or more first radial cooling channels is a plurality of first radial cooling channels circumferentially spaced apart in the rotor core.

6. The electric machine of claim 1, wherein the one or more first radial cooling channels and the one or more second radial cooling channels is a plurality of radial cooling channels at two different axial locations of the rotor.

7. The electric machine of claim 1, further comprising one or more sleeve cooling channel outlets at one or more axial ends of the one or more sleeve cooling channels, the one or more sleeve cooling channel outlets configured to direct the flow of cooling fluid toward an end turn of the stator winding.

8. A rotor of an electric machine, comprising:
a rotor core;
a plurality of permanent magnets disposed at the rotor core;
a rotor sleeve enclosing the rotor core and the plurality of permanent magnets;
one or more sleeve cooling channels disposed between a radially outer surface of the rotor core and a radially inner surface of the rotor sleeve and extending axially along a length of the rotor;
one or more radial cooling channels extending radially outwardly from an interior of the rotor core to the one or more sleeve cooling channels, the one or more radial cooling channels configured to convey a flow of cooling fluid from the interior of the rotor core to the one or more sleeve cooling channels; and
one or more sleeve cooling channel outlets of the one or more sleeve cooling channels defined at an axial end of the rotor assembly, so that the flow of cooling fluid exits the one or more sleeve cooling channel outlet in an axial direction;
wherein the one or more radial cooling channels is a plurality of radial cooling channels at two different axial locations of the rotor.

9. The rotor of claim 8, wherein the one or more radial cooling channels are positioned in an axial interior of the rotor core between a first axial end and a second axial end of the rotor core.

10. The rotor of claim 9, wherein the one or more radial cooling channels are located at an axial midpoint of the rotor core.

11. The rotor of claim 8, wherein the flow of cooling fluid is directed into the one or more radial cooling channels from a hollow interior of a rotor shaft.

12. The rotor of claim 8, further comprising a mid-stack plate disposed in the rotor core, the one or more radial cooling channels formed in the mid-stack plate.

13. The rotor of claim 8, wherein the one or more radial cooling channels is a plurality of radial cooling channels circumferentially spaced apart in the rotor core.

14. The rotor of claim 8, wherein the one or more sleeve cooling channel outlets are configured to direct the flow of cooling fluid toward an end turn of a stator winding of the electric machine.

15. A method of cooling a rotor of a permanent magnet electric machine, comprising:
directing a flow of cooling fluid into an interior of a rotor core of the rotor;
wherein one or more first radial cooling channels are formed in a first mid-stack plate disposed in the rotor core; and wherein one or more second radial cooling channels are formed in a second mid-stack plate disposed in the rotor core;

urging the flow of cooling fluid radially outwardly through the one or more first radial cooling channels and radially outwardly through the one or more second radial cooling channels defined in the rotor core; and directing the flow of cooling fluid from the one or more first radial cooling channels and from the one or more second radial cooling channels along one or more sleeve cooling channels extending in an axial direction between the rotor core and a rotor sleeve surrounding the rotor core.

16. The method of claim 15, wherein the one or more first radial cooling channels and the one or more second radial cooling channels are positioned in an axial interior of the rotor core between a first axial end and a second axial end of the rotor core.

17. The method of claim 15, wherein the one or more first radial cooling channels are axially spaced apart from the one or more second radial cooling channels in the rotor core.

18. The electric machine of claim 1, wherein the one or more first radial cooling channels are circumferentially offset from the one or more second radial cooling channels.

* * * * *